United States Patent
Jarczynski et al.

(10) Patent No.: US 6,268,668 B1
(45) Date of Patent: Jul. 31, 2001

(54) GAS COOLED GENERATOR STATOR STRUCTURE AND METHOD FOR IMPINGEMENT COOLING OF GENERATOR STATOR COIL

(75) Inventors: Emil Donald Jarczynski, Scotia, NY (US); Christopher Charles Glynn, Hamilton; Kenneth E. Seitzer, Mason, both of OH (US); Gary Mercer, Simpsonville, SC (US); Christian Lee Vandervort, Vooheesville, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/476,094

(22) Filed: Jan. 3, 2000

(51) Int. Cl.[7] .................................................. H02K 9/00
(52) U.S. Cl. ............................................................. 310/52
(58) Field of Search .................................. 310/55, 52, 254, 310/53, 54, 58, 59, 65, 64

(56) References Cited

U.S. PATENT DOCUMENTS

| | | | |
|---|---|---|---|
| 876,568 | | 1/1908 | Lord .................................. 310/63 |
| 2,663,808 | * | 12/1953 | Rosenberg et al. ................ 310/55 |
| 2,780,739 | * | 2/1957 | Baudry .............................. 310/55 |
| 2,920,218 | * | 10/1960 | Beckwith ........................... 310/55 |
| 2,920,219 | * | 1/1960 | Beckwith ........................... 310/55 |
| 3,280,350 | * | 10/1966 | Burdge et al. ..................... 310/11 |
| 3,597,645 | * | 8/1971 | Duffert et al. ..................... 310/14 |
| 3,906,265 | * | 9/1975 | Giles ................................. 310/55 |
| 3,995,180 | * | 11/1976 | Giles ................................. 310/55 |
| 4,013,908 | * | 3/1977 | Weghaupt .......................... 310/61 |
| 4,051,399 | | 9/1977 | Stanwick et al. .................. 310/51 |
| 4,071,791 | | 1/1978 | Armor et al. ...................... 310/59 |
| 4,278,906 | * | 7/1981 | Kullmann .......................... 310/52 |
| 4,282,450 | * | 8/1981 | Eckels ............................... 310/52 |
| 4,311,931 | * | 1/1982 | Fujioka et al. .................... 310/55 |
| 4,352,034 | | 9/1982 | Karhan et al. ..................... 310/59 |
| 4,363,982 | * | 12/1982 | Kaminski .......................... 310/61 |
| 4,365,177 | * | 12/1982 | Msdsen ............................. 310/61 |
| 5,633,543 | | 5/1997 | Jarczynski et al. ................ 310/59 |
| 5,652,469 | | 7/1997 | Boardman et al. ................ 310/58 |
| 5,883,448 | | 3/1999 | Zimmerman ....................... 310/52 |

OTHER PUBLICATIONS

Gibney, III et al; "GE Generators—An Overview"; 35th GE Turbine State-of-the-Art Technology Seminar; Aug. 1991; pp. 1, 4–7, 10–11.

* cited by examiner

Primary Examiner—Elvin Enad
Assistant Examiner—Guillermo Perez
(74) Attorney, Agent, or Firm—Nixon & Vanderhye

(57) ABSTRACT

A new stator core cooling concept is provided that can be implemented with a conventional core structure having cooling ducts interspersed at intervals along the axial length of the stator core. To enhance cooling of the stator coils, the cooling ducts are radially closed off so that cooling air is forced to flow circumferentially, preferably through small holes, channels, or slots, to impinge directly on the armature bar surface. Accordingly, rather than flowing cooling gas through the cooling ducts and immediately discharging it into the annular gap between the rotor and stator, cooled gas flows radially down through the cooling duct and then must flow circumferentially whereupon it impinges directly on the armature bar surface itself.

17 Claims, 5 Drawing Sheets

GAS COOLED GENERATOR STATOR STRUCTURE AND METHOD FOR IMPINGEMENT COOLING OF GENERATOR STATOR COIL

BACKGROUND OF THE INVENTION

The present invention relates to gas cooled generator stators and, more particularly, to a structure and method for impingement cooling of generator stator coils.

During the process of producing electricity, power generators also create heat that must be dissipated away from the generator. Generators are typically gas-cooled by ventilated cooling systems that circulate cooling gasesthrough ducts in the rotor and stator.

By way of example, FIG. 1 shows a cross-section of one-half of a generator 10, (see axial center line 12 and longitudinal center-line 14) havinga reverse flow ventilated cooling system. In this example, a portion 16 of the flow of cooling gases is directed to the rotor 18. The cooling gases are drawn through ventilation ducts 20 in the rotor by centrifugal forces created by the spinning rotor. As the gases flow through the rotor, heat in the rotor is transferred to the gases. Thus, heated gas exits the rotor ducts 20 at the surface of the rotor 18 and enters an air gap 22 between the rotor 18 and stator 24. Fans 26 mounted at the ends of the rotor 18 (only one of which is shown in FIG. 1) draw these heated gases through the annular gap 22 and direct the same via an external duct 28 to a heat exchanger 30 for cooling the gas.

The stator 24 is cooled by ventilation flow path(s) that are separate from the flow paths in the rotor 18. Gas 32 cooled by the heat exchanger 30 enters a plenum chamber 34 surrounding the stator 24. Cooling gas tends to flow in greater volume and velocity through stator ducts near the ends of the stator because the end sections of the stator are closest to the exhaust fans 26. This potential imbalance in the flow of cooling gas through the stator is preferably compensated for by varying the spacing and cross-sectional area of stator cooling ducts along the length of the stator to optimize the distribution of cooling gases through the stator and minimize the necessary pressure head needed for the cooling gases. The cooled gas flows to the stator outer circumferential surface 38 and into the cooling ducts 40 defined between the packets 42 of stator core laminations.

Referring to FIG. 2, the armature bars 44, 46 are secured in the stator coil slot 48 with filler 50, top-ripple spring(s) 52, and stator wedge 53 to restrain the bars radially, and with side-ripple spring(s) 54 to increase friction between the bars 44, 46 and the side walls of the slot 48. Referring to the lower armature bar 44 for convenience, the heat that is generated in the copper strands 56 of the armature bar 44 is thermally conducted along a heat flow path 58 from the strands 56, through a layer of insulation 60 to the side walls of the slot 48.

As noted above, cooling ducts 40 are incorporated into the stacks of laminations defining the stator core 24. Referring to FIG. 3, space blocks 62, 64 are provided axially between adjacent stator core packets 42 for defining the axial dimensions of the ducts 40 and for directing the cooling air flow radially through the stator 24. As the gas flows radially inwardly through the stator 24, heat from the stator coils 44, 46 is transferred to the gas. In conventional systems, the cooling gas ducts 40 are open ended so that the cooling gas flows radially directly into the annular gap 22 between the rotor 18 and stator 24 and then flows axially along that gap under the influence of the fans 26 for return to the heat exchanger 30.

As is apparent from the foregoing, the current-carrying copper conductors 56 of the typical stator coil/armature bar 44 are indirectly cooled. That is, in systems of the type described above, the coolant does not directly contact the current-carrying copper conductors 56 of the armature bar 44, nor indeed most of the bar 44. Instead, there is a thermal conduction path 58 from the armature bar 44 to the walls of the stator slot(s) 48. Thereafter the heat must be conducted through the lamination packet 42 to the adjacent cooling duct(s) 40.

This thermal conduction path 58, however, includes regions of imperfect contact between, e.g., the armature bar 44 and the side walls of the slot 48. The imperfect contact is inherent in the assembly of the multiple components. For example, because of the nature of the armature bar 44, it is not perfectly flat. Moreover, because of the assembly tolerance of the laminations that define the packets 42, the stack of laminations from which the core 24 is made may not align perfectly, so the slots 48 are not perfectly straight. More specifically, laminations may be slightly rotated clockwise or counterclockwise relative to a next adjacent lamination. Dead-air spaces are formed when individual adjacent laminations are slightly offset from each other in the peripheral direction. As a result, there are voids in the thermal conduction path, referred to as lamination stagger. Voids and imperfect contact of the type described above cause increased thermal resistance between the bar, which is the source of heat, and the cooling duct which is where the heat is taken away. High thermal resistance results in a higher operating temperature of the armature bar, which limits the output performance of the generator, since there is an imposed limit on the bar operating temperature.

In addition to the aforementioned imperfect thermal conduction paths in/along the stator slot, there is a further thermal resistance conduction path through the stack of stator core laminations. More specifically, once the heat is conducted through the thermal-contact resistance in the slot, heat needs to flow peripherally, radially and/or axially through the stack of iron laminations eventually to the cooling duct surface. The axial conduction path in particular presents a high resistance to heat flow since there is thermal contact resistance and often an enamel layer in between individual laminations in the stack.

BRIEF SUMMARY OF THE INVENTION

In view of the problems and inefficiencies observed with the traditional methods of heat removal, a more effective heat removal path would be highly desirable. The end result of a more effective heat removal path would be a lower operating temperature for the stator armature bar. In that regard, the power output for a generator is limited by how hot the armature bar can get. Indeed, the stator RTD temperature is monitored by the customer and will limit the output of the machine. If the stator bar can be cooled more effectively, the machine can produce more output for the same size unit. This in turn results in an increase in power density which realizes a cost reduction because more power can be made onto the grid with a smaller size machine.

The invention is embodied in a new stator core cooling concept that can be implemented with the basic core structure described above, having cooling ducts interspersed at intervals along the axial length of the stator core. More particularly, the concept of the invention is embodied in a stator core in which cooling ducts are radially closed off. Thus, cooling air is forced to flow circumferentially preferably through small holes, channels, or slots to impinge directly on the armature bar surface. Thus, rather than flowing cooling gas through the cooling ducts and immediately discharging it, cooling gas flows radially through the cooling duct and then must flow circumferentially whereupon it impinges directly on the armature bar surface itself.

In a preferred embodiment of the invention, once the cooling gas impinges on the armature bar surface, it is directed to flow axially, along at least a portion of the length of the armature bar. Advantageously, the axial flow extends into the lamination packet. The cooling gas flow may then be directed, for example, into the gap between the stator and rotor and through aperture(s) in the stator wedge.

Accordingly, the invention is embodied in an electromagnetic generator that comprises a stator structure concentrically disposed to a rotor structure, the stator structure including stator core packets annularly disposed around the rotor and radial stator cooling ducts defined between the stator core packets, with each of the stator cooling ducts extending radially between the outer stator surface and the inner stator surface proximate the rotor, the stator structure further defining a plurality of axially extending stator slots and tooth portions circumferentially between the slots, and a baffle structure having part circumferential portions for intercepting radial cooling air flow through the cooling ducts and redirecting the flow in a circumferential direction.

The invention is further embodied in a method of impingement cooling a stator coil that comprises providing a stator structure having a radially outer surface and a radially inner surface, and including stator core packets and radial stator cooling ducts defined between the stator core packets, each of the stator cooling ducts extending radially between the outer stator surface and the inner stator surface, the stator structure further defining a plurality of axially extending stator slots and tooth portions circumferentially between the slots; flowing cooling air radially inwardly through the cooling ducts; intercepting the radial cooling air flow in a vicinity of a tooth portion of the stator structure; and directing the intercepted cooling air circumferentially onto at least one stator coil disposed in an adjacent slot of the stator.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

The present invention is embodied in a cooling system wherein rather than depending solely upon the conduction of armature bar heat laterally from the armature bar through the insulation wall, side ripple spring(s), if present, to the cooling duct, and heat conduction through the stator slot and laminations to the cooling duct surface, the cooling gas is directed onto and along the armature bar surface, preferably through cooling jet or nozzle openings. Since the flow is directed onto the armature bar, the system of the invention utilizes impingement cooling. The heat transfer co-efficient associated with directly impinging jets is several times higher than normal through-flow duct coefficients, so that the armature bar realizes much higher heat transfer. After the cooling jets impinge on the sides of the bar, the gas flow continues through axial cooling channels incorporated in the stator slot so that the cooling gas flows along the sides of the bar and continues to cool it. The flow must ultimately be discharged from the stator slot into the annular gap between the rotor and stator. In the presently preferred embodiment, the heated cooling gas discharges through the stator wedge structure into the annular gap between the rotor and the stator. The discharge hole in the stator wedge is oriented such that exit gas flow impinges a second time, on the side of the stator tooth tip surface, which is a second source of significant heating. Once the cooling air discharges through the stator wedge onto the tooth surface, the flow exits through the annular gap to the cooling fan mounted on the end of the rotor, for exhausting hot gas from the interior of the machine.

Figure 4:
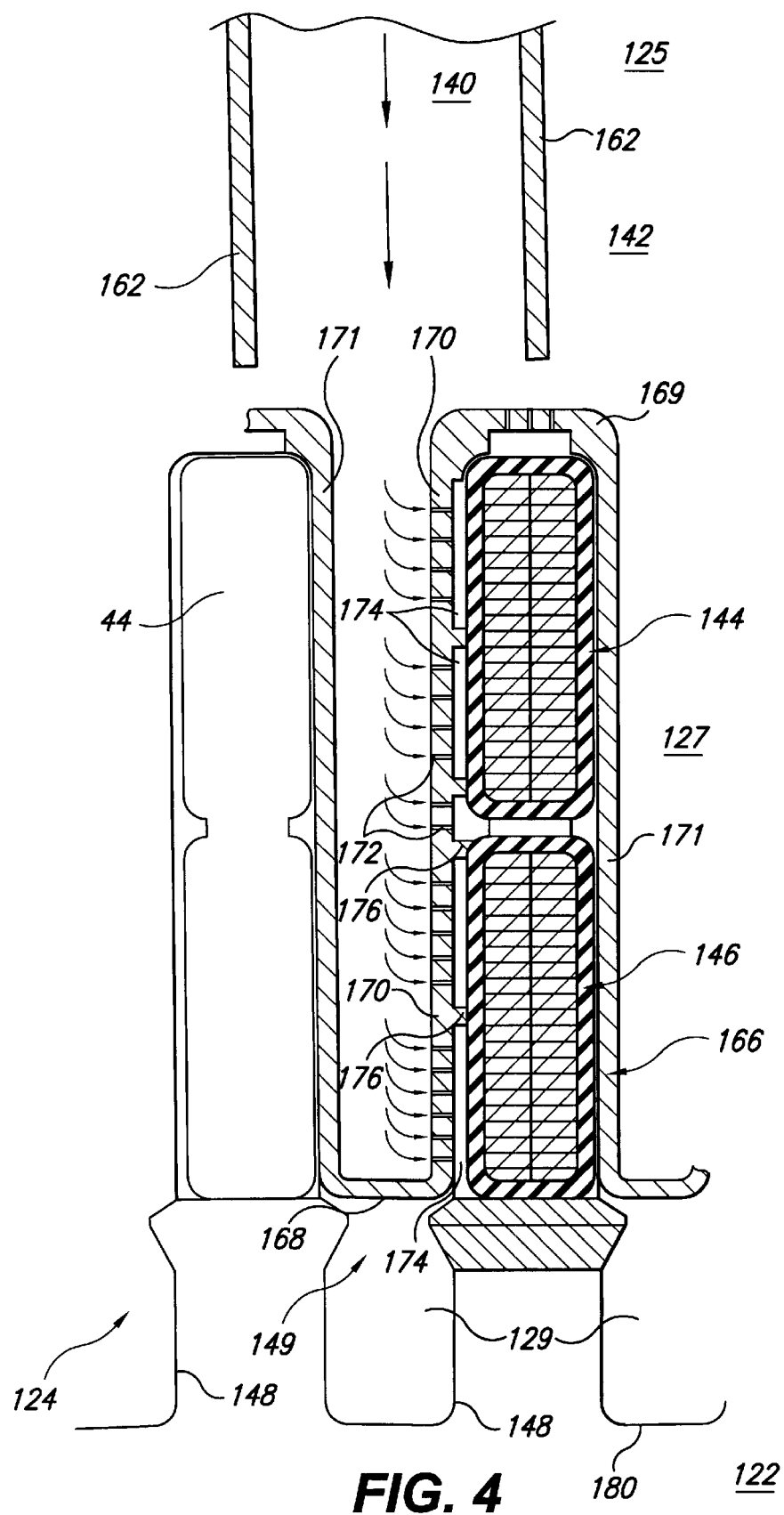
FIG. 4 is a broken away, cross-sectional view taken along line A—A in FIG. 1 showing a structure for providing impingement cooling in accordance with the present invention.
Figure 5:
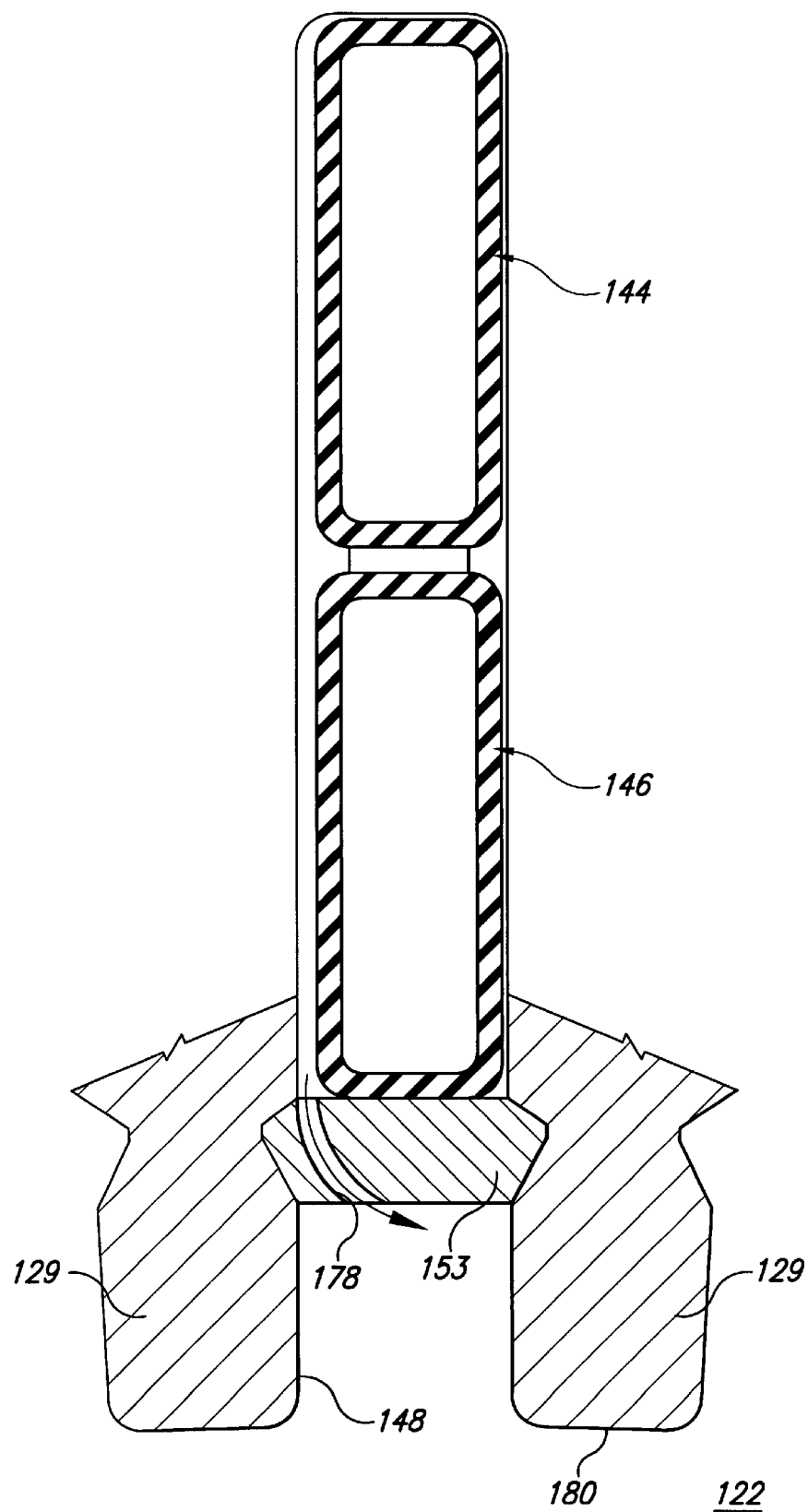
FIG. 5 is a view similar to FIG. 4 but taken along line 5—5 in FIG. 1.

With reference to FIGS. 4–5, the cooling flow path in accordance with the invention from where it enters the stator core, to where the cooling work is primarily effected, to where it exits, will now be described with greater specificity. For convenience, the components of the inventive system that correspond to those of the conventional systems are identified by the same or similar reference numerals incremented by 100.

Figure 1:
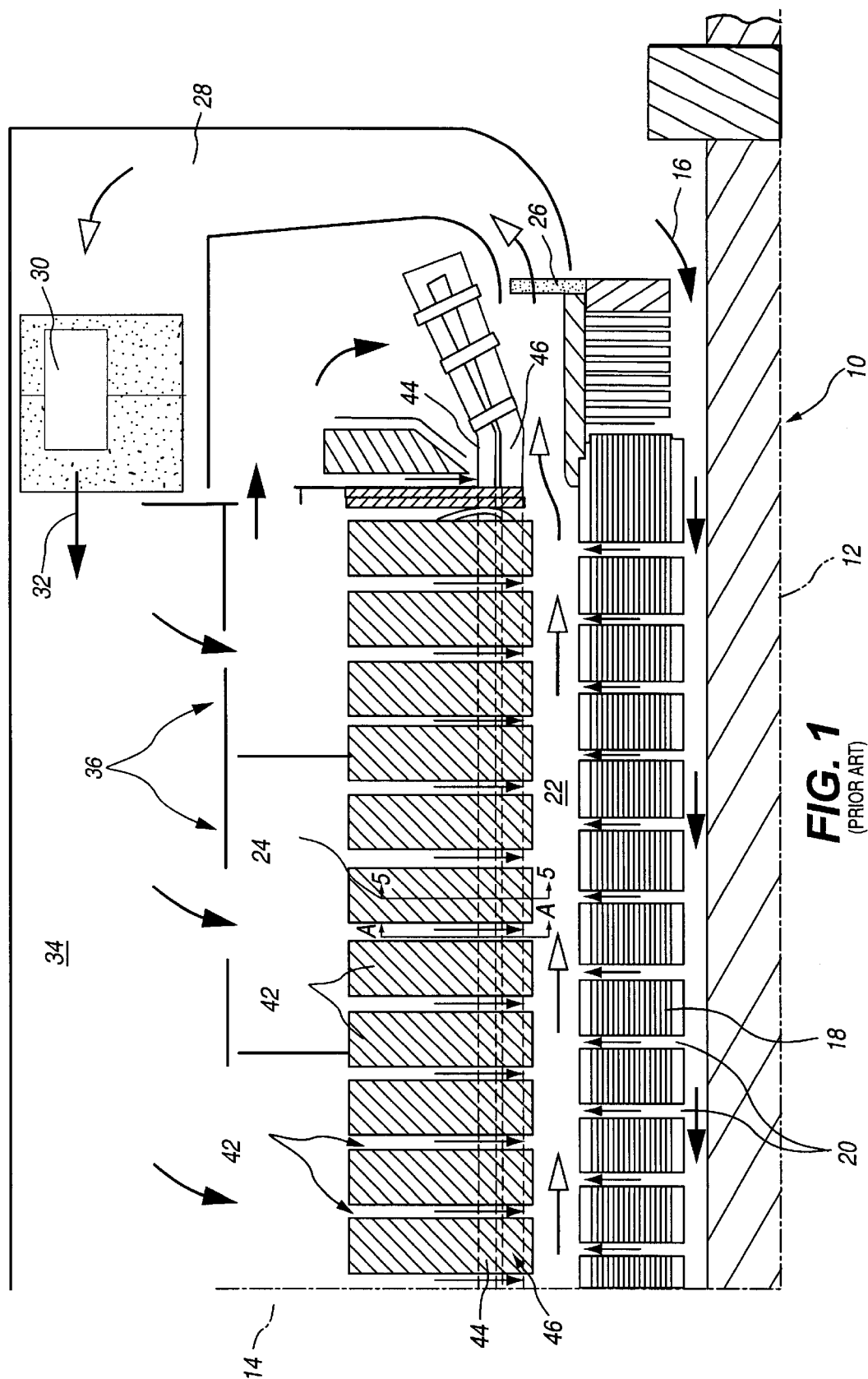
FIG. 1 is a schematic cross-sectional diagram of a generator showing a reverse flow cooling system.
Figure 2:
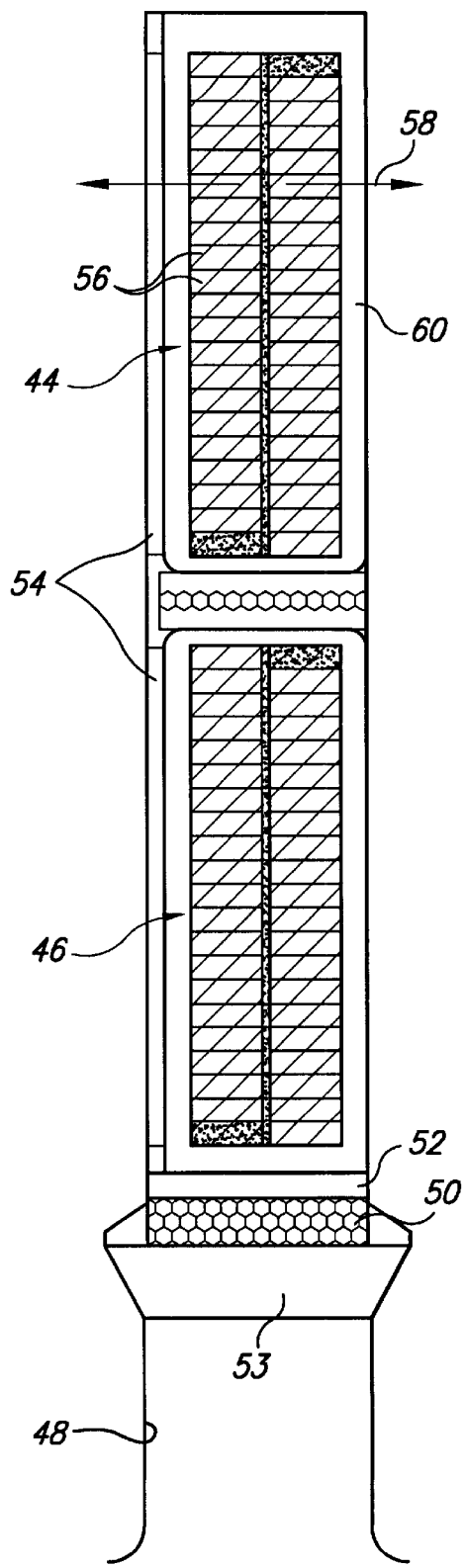
FIG. 2 is a broken away, cross-sectional view of a conventional stator slot illustrating the conventional thermal-conduction path from armature bar to stator slot to lamination.

The cooling gas enters from the radially outer surface of the stator core (not shown in FIG. 4, but illustrated at 38 in FIG. 1). That cooling gas enters the ducts 140 defined circumferentially by pairs of space blocks 162. As discussed above, the cooling gas duct 140 is formed axially between axially adjacent packets 142 of laminations that the space blocks 162 separate and the gas flows through the cooling gas duct, radially inwardly of the stator core 124. As the cooling gas flows through this duct, some heat is removed as the gas passes through the stator core yoke 125 since the stator core yoke 125 is an active electromagnetic component where heat is generated. The cooling flow continues radially down into the tooth portion 127 of the duct where it continues to remove heat since the stator core teeth 127 are also active electromagnetic components. The cooling flow now approaches a serpentine space block 166 which redirects the cooling flow to realize the improved cooling effect of the present invention.

The serpentine spacer 166, as illustrated in particular in FIG. 4, traverses the periphery of the stator slot 148 and bridges the radially inner periphery 149 of the cooling air duct 140 between adjacent stator slots 148, thereby to preclude radial flow of cooling air into the gap 122 between the rotor (not shown in FIG. 4) and stator 124. More specifically, the spacer 166 includes circumferential portions 168, 169 and radial portions 170, 171. The circumferential portions 168 intercept radial cooling air flow and direct it circumferentially, toward a respective adjacent stator slot 148.

Figure 3:
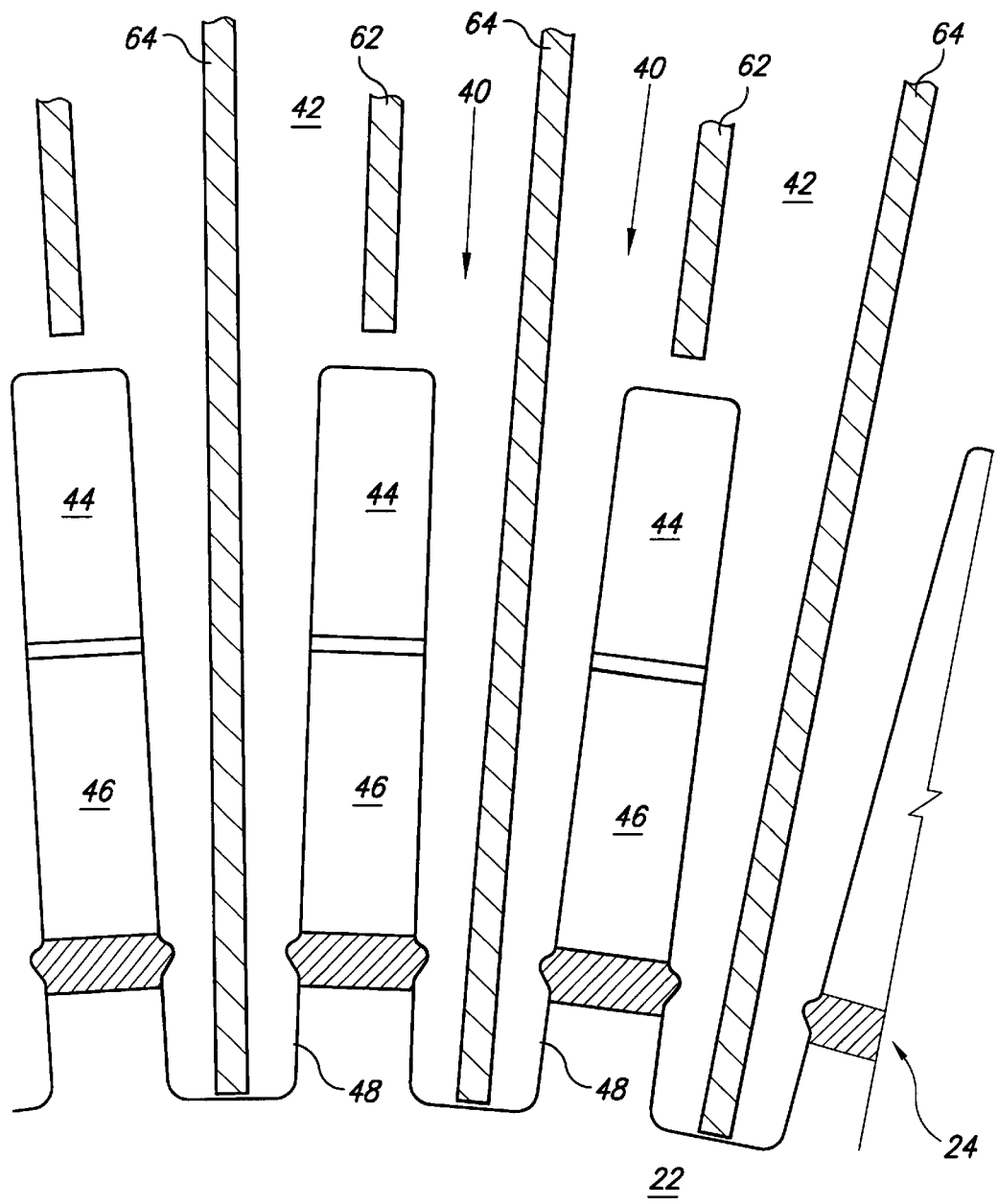
FIG. 3 is a broken away, cross-sectional view taken along line A—A in FIG. 1 showing a conventional cooling duct.

As illustrated in FIG. 4, typically two armature bars, lower armature bar 144 and upper armature bar 146 are provided inside each stator slot 148. The cooling gas flows from the tooth portion 127 through apertures hereinafter referred to as impingement holes 172, defined in the radial portions 170 of the serpentine spacer 166. The cooling gas passes through the impingement holes as cooling jets that impinge on the surface of the upper and/or lower armature bars 144, 146, directly cooling those bars, which are the primary sources of the stator heat. In an exemplary embodiment, the impingement holes are small diameter holes that form nozzles in the serpentine spacer. However, rather than drilled holes, milled slots may be provided for manufacturing simplicity, since adjacent laminations 142 of the stator core form the closure for such nozzles, thereby forming a closed passage for the impingement jet passages. The slots or holes could also be formed in a molded non-metallic piece integrated with a serpentine partition. In the illustrated embodiment, the impingement holes 172 are shown in the radial portion 170 of the serpentine spacer 166 on only one side of the armature bars 144, 146, however, holes may be provided in either or both radial portions 170, 171 bordering the armature bars 144, 146. Also, the cooling jets may be disposed to direct cooling air onto either or both of the lower and upper armature bars 144, 146, and may be disposed to direct cooling air onto the radial end of bar 144 through circumferential portions 169 as shown in FIG. 4. Where holes 172 are provided on both radial portions of each slot, a space block similar to space block 64 (FIG. 3) may be provided between adjacent slots 148 to divide and direct cooling gas to the holes 172 of each radial portion 170, 171.

The cooling gas that flows through the impingement holes 172 impinges on and directly cools the lower and/or upper bars 144, 146, as noted above. In the presently preferred embodiment, after the gas jets impinge on the lower and/or upper bars, the cooling air flow progresses axially through axial flow path(s) 174, for example, along at least a portion of the length of the armature bar(s) 144, 146. To provide for cooling gas impingement and define axial flow path(s), a plurality of projections 176 project generally circumferentially from the radial portion(s) 170 of the serpentine spacer 166 to define a gap between the radial portion 170 and the armature bar(s) 144, 146. The projections may be in the form of projecting elongated ribs and/or discreet dimples for defining axial flow path(s) 174 and/or radial flow path(s) for the cooling air.

As noted above, the cooling flow preferably progresses axially along at least a portion of the length of the stator coils. To provide for such axial flow in the illustrated embodiment, the impingement holes 172 are defined in the cooling duct 140 (as illustrated in FIG. 4) and axial downstream therefrom, e.g., within the lamination packet 142, discharge hole(s) 178 is/are defined in the stator wedge 153, as shown in FIG. 5. Since core loss, that is magnetic hysteresis loss, is generated in the tooth tip 129, it is advantageously cooled in the illustrated embodiment. Accordingly, the discharge hole(s) 178 may be oriented in such a way that the cooling gas now impinges on the sides of the tip 129 of the stator tooth 127. The stator tooth tip is thus the last portion of the stator core to be washed by cooling gases.

Once the exiting cooling gas impinges on the tooth tip, it is discharged into the air gap 122 which is the annular gap between the stator radially inner surface 180 and the rotor outer diameter surface (shown in FIG. 1). The cooling gas discharging into the air gap travels axially to the exit of the cooling circuit, typically by means of the cooling fan mounted on the end of the rotor that is exhausting hot gas from the interior of the machine.

As is evident from the foregoing, along the axial length of the stator core there will be a multiplicity of exiting jets with respect to air flow through the cooling ducts that have cooled small increments of the axial length of the stator coils/stator core. Thus, there is a repeating pattern provided with the cooling system described hereinabove composed of radial inflow through the cooling ducts, impingement jets on the armature bar surfaces, axial flow through channels along side of the bars, discharge through hole(s) in the stator wedge, preferably oriented to impinge on the tooth tip, and exiting into the air gap. It is preferred that cooling packets of this type be relatively short in the axial direction since a greater number of short packets results in minimum gas temperature rise through each packet and significant surface area exposed to cooling. Since typically in machines of the type described hereinabove, the cooling patterns are symmetrical about the longitudinal center line, half the total cooling flow will discharge from each end of the machine.

In the illustrated embodiment, the serpentine space blocks are provided at the radially inner end of otherwise generally conventional cooling air ducts, thereby to direct the radial flow circumferentially as impingement jets onto the stator coils. In the embodiment illustrated in FIG. 4, the space block that conventionally extended into the tooth is omitted. However, that space block may be retained and either terminate with the circumferentially adjacent space blocks 162 or when, for example, impingement holes are defined on both radial portions 170, 171 of the serpentine spacer, can extend into the tooth 127 as in the conventional structure, to divide cooling flow between those radial portions 170, 171 of the serpentine spacer and thus between adjacent slots 148. To facilitate cooling flow along the requisite portion of the axial length of the stator core packets, side ripple springs or other fillers may be provided at suitable axial and/or radial portions of the stator slots for defining axial cooling flow paths between the bar(s) and the slot wall(s).

While the invention has been described with reference to a cooling system having radial inflow sections, the invention could be applied to a system having radial outflow sections. In that regard, to be adapted to radial outflow sections, rather than providing part circumferential portions 168 at the radially innermost end of the tooth, corresponding part circumferential portions would be provided at the top end of the respective stator tooth, generally circumerentially adjacent part circumferential portions 169, with walls corresponding to radial portions 170 and 171 projecting radially inwardly therefrom. With such an assembly, the cooling air would flow radially outwardly, be redirected to flow circumferentially through impingement holes onto the armature bars, and then flow axially along the armature bars to exit into the next axially downstream duct, e.g. through perforations in the circumferential wall portion 169.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electromagnetic generator comprising:
  a stator structure concentrically disposed to a rotor structure, said stator structure having a radially outer surface and a radially inner surface, and including stator core packets annularly disposed around the rotor and radial stator cooling ducts defined between said stator core packets, each of the stator cooling ducts extending radially between said outer stator surface and the inner stator surface proximate the rotor, said stator structure further defining a plurality of axially extending stator slots and tooth portions circumferentially between said slots, and a baffle structure having part circumferential portions for intercepting radial cooling air flow through said cooling ducts and redirecting said flow in a circumferential direction, wherein said baffle structure redirects flow circumferentially towards at least one stator coil disposed in a said stator slot, wherein said baffle structure further comprises radial portions so as to define a generally serpentine shaped space block traversing a perimeter of said stator slots and having at least one aperture for impinging cooling air onto said at least one stator coil disposed in said stator slot.

2. An electromagnetic generator as in claim 1, wherein each said aperture comprises a hole defined through a said radial portion of said serpentine baffle structure.

3. An electromagnetic generator as in claim 1, wherein said circumferential portions and said radial portions of said baffle structure are integrally formed to define a unitary structure.

4. An electromagnetic generator as in claim 1, wherein a wedge radially retains said at least one coil in said stator slot and further comprising a cooling air outlet defined through said wedge.

5. An electromagnetic generator as in claim 4, wherein said outlet defined in said wedge is axially offset with respect to said at least one aperture, whereby cooling flow between said at least one aperture and said outlet traverses at least a part of an axial length of said at least one coil.

6. An electromagnetic generator as in claim 1, further comprising at least one projection circumferentially projecting from said serpentine space block so as to space said serpentine space block from said at least one coil thereby to define a cooling air flow path therebetween.

7. An electromagnetic generator comprising:

a cylindrical rotor;

a stator mounted concentric to said rotor so as to define an annular gap therebetween, said stator including annular stator core packets disposed axially along the length of the stator, radial stator cooling ducts being defined between adjacent stator core packets and open at an outer periphery of the stator and substantially closed in a radial direction proximate a radially inner periphery thereof, said stator further defining a plurality of axially extending stator slots and tooth portions circumferentially between said slots, a radially inner end of at least one of said cooling ducts being defined by a plurality of circumferential wall parts and a plurality of radial wall parts, at least the circumferential wall parts that are disposed between adjacent stator slots being substantially imperforate, said radial wall parts being disposed on circumferential sides of each slot, and at least one of said radial wall parts having at least one aperture defined therethrough.

8. An electromagnetic generator as in claim 7, further comprising:

a cooling gas plenum, located radially outwardly of the stator and open radially to the stator cooling ducts, whereby cooling gas enters an inlet to the plenum and flows through the plenum into said radial cooling ducts;

a heat exchanger having an exhaust outlet coupled to the inlet to the gas cooling plenum whereby gas enters an inlet to the heat exchanger, passes through the heat exchanger, exits the exhaust outlet and flows into the plenum;

a cooling gas conduit coupled to the inlet of the heat exchanger at a first end and open to the annular gap at a second end; and a fan for directing gas from the annular gap between the stator and rotor to the heat exchanger.

9. An electromagnetic generator as in claim 7, wherein said circumferential wall parts that are disposed between adjacent stator slots redirect radial cooling air flow to flow circumferentially, through said at least one aperture towards at least one stator coil disposed in a said stator slot disposed circumferentially adjacent thereto.

10. An electromagnetic generator as in claim 9, wherein a wedge radially retains said at least one coil in said stator slot and further comprising a cooling air outlet defined through said wedge.

11. An electromagnetic generator as in claim 10, wherein said outlet defined in said wedge is axially offset with respect to said at least one aperture, whereby cooling flow between said at least one aperture and said outlet traverses at least a part of an axial length of said at least one coil.

12. An electromagnetic generator as in claim 9, further comprising at least one projection circumferentially projecting from said at least one radial wall part so as to space said radial wall part from said at least one coil thereby to define a cooling air flow path therebetween.

13. An electromagnetic generator as in claim 7, wherein each said aperture comprises a hole defined through said radial wall part.

14. An electromagnetic generator as in claim 7, wherein said circumferential wall parts and said radial wall parts are integrally formed to define a unitary structure.

15. A method of cooling a stator coil comprising:

providing a stator structure having a radially outer surface and a radially inner surface, and including stator core packets and radial stator cooling ducts defined between said stator core packets, each of the stator cooling ducts extending radially between said outer stator surface and the inner stator surface, said stator structure further defining a plurality of axially extending stator slots and tooth portions circumferentially between said slots;

flowing cooling air radially through the cooling ducts;

intercepting said radial cooling air flow in a vicinity of a tooth portion of said stator structure; and directing the intercepted cooling air circumferentially onto at least one stator coil disposed in an adjacent slot of said stator.

16. A method as in claim 15, further comprising, after said directing step, flowing said cooling gas axially along at least a portion of a length of said at least one stator coil, and then flowing said cooling gas radially toward said stator inner surface.

17. A method as in claim 16, further comprising impinging said cooling flow against a tip of a said tooth portion.

* * * * *